United States Patent [19]

Colburn et al.

[11] 4,200,614
[45] Apr. 29, 1980

[54] TURBINE MIXER

[75] Inventors: Samuel E. Colburn, Middletown; James W. Mauck, West Chester, both of Ohio

[73] Assignee: National Distillers and Chemical Corporation, New York, N.Y.

[21] Appl. No.: 878,623

[22] Filed: Feb. 17, 1978

[51] Int. Cl.² ............................ B01J 1/00; B01J 3/04
[52] U.S. Cl. ...................... 422/134; 366/307; 366/316; 366/329; 422/135; 422/138; 422/226; 422/228; 422/242
[58] Field of Search .................... 23/290, 252 R, 283, 23/285, 270.5 T, 290.5; 526/65; 366/329, 328, 302, 307, 315, 316; 261/84; 422/134, 135, 138, 226, 228, 242, 189

[56] References Cited
U.S. PATENT DOCUMENTS

| 781,406 | 1/1905 | Devereux | 366/307 X |
|---|---|---|---|
| 2,063,789 | 12/1936 | Burk | 23/270.5 T |
| 2,776,193 | 1/1957 | Habicht | 23/283 |
| 2,793,166 | 5/1957 | Hatch | 366/307 X |
| 2,944,877 | 7/1960 | Marco | 23/290.5 |
| 3,047,368 | 7/1962 | Marco | 23/290.5 X |
| 3,756,996 | 9/1973 | Pugh et al. | 23/283 X |

Primary Examiner—Joseph Scovronek
Attorney, Agent, or Firm—Kenneth D. Tremain

[57] ABSTRACT

A turbine mixer for a polyethylene reactor of the stirred autoclave type in which a turbine rotor is mounted on a rotating stirrer shaft extending along the longitudinal axis of the reactor and a turbine stator is mounted adjacent to and upstream of the rotor. The turbine mixer is positioned in the final stage of a three-stage, stirred autoclave reactor, and a baffle plate is positioned so as to extend across the reactor at the inlet to the final zone. The mixer produces intense stirring of the reactor materials within the final stage, but does not cause significant backmixing into the reactor zone immediately upstream thereof. The turbine mixer may also be utilized in other zones of the reactor wherein intense axial mixing of the reactor materials is required, in which case the baffle plate would be omitted so as to produce intensive axial mixing of the reactor materials within that zone.

10 Claims, 6 Drawing Figures

TURBINE MIXER

BACKGROUND OF THE INVENTION

1. Field of the Invention

The present invention relates, in general, to mixers and, more particularly, to an improved and novel mixer for stirred autoclave reactors for producing polyethylene.

2. Discussion of the Prior Art

It is well recognized in the current technology that polyethylene may be produced within stirred autoclave reactors. Apparatus of this nature has been described in the patent literature over the past thirty years or more, for example, as early as Krase et al U.S. Pat. No. 2,396,791 granted to DuPont on Mar. 19, 1946; in Pugh et al U.S. Pat. No. 3,756,996 granted to National Distillers and Chemical Corporation on Sept. 4, 1973 and; more recently, in Platz et al U.S. patent application Ser. No. 714,451 filed Aug. 16, 1976 for Ethylene Polymerization Reactor, now U.S. Pat. No. 4,071,325 also assigned to National Distillers and Chemical Corporation.

In Pugh et al and Platz et al mixing is accomplished within the reaction vessel by a plurality of agitator blades attached to a rotatably mounted shaft which extends along the longitudinal axis of the reactor. The rotating shaft supports a number of different types of agitator blades mounted at various stages along the axis of the shaft, a first group of the blades being trapezoidal in configuration and extending radially outwardly from the shaft so as to sweep through an annulus representing a portion of the cross-sectional area of the reactor. A second group of agitator blades is provided with blades each having a pentagonal configuration, and extends radially outwardly from the shaft to a distance adjacent the inner cylindrical wall of the reactor. The respective sets of blades are angularly adjustable so as to move the reaction mixture generally in one direction or upstream through the annular portion of the reactor proximate the agitator shaft and in an opposite direction or downstream along a portion of the reaction chamber adjacent the inner cylindrical reactor wall, with the extent of these oppositely directed movement being adjustable to produce either localized radial mixing or non-localized axial mixing as required in the different zones of the reactor. Accordingly, the types of agitator blades employed, and the angular adjustments thereof, regulate the proportion of localized radial mixing relative to non-localized axial mixing.

In a modified, stirred autoclave reactor system of this type, the ethylene gas feed rates, the volume and dimensions of the reaction region, the pressure, the types of agitation employed in the reactor, and the catalysts and their mode of injection are selected so as to produce a predetermined temperature profile longitudinally along the reactor vessel. The temperature of the reactor materials increases along the length of the reactor from about 270° to 575° F., while the pressure is elevated, frequently in excess of 20,000 psi. When a particular temperatur profile is maintained, an ethylene polymerization product is formed having improved optical and processing characteristics which render it particularly suitable for use in film-forming and molding applications.

The reactor apparatus for polymerizing ethylene in the modified, stirred autoclave reactor system includes an elongated, either vertically or horizontally oriented vessel incorporating a generally cylindrical reaction chamber. The ratio of length to diameter (L/D) of the chamber generally is at least 15:1, and may be 40:1, or even higher. The ethylene is initially passed through a first reaction zone or stage within the reactor in which a first, low temperature catalyst is employed in the chemical reaction. The reaction mixture within the first zone or storage is agitated to produce both radial and axial or end-to-end mixing, thereby ensuring the presence of a substantially uniform reaction temperature throughout the zone. The reaction mixture then flows from the first stage into a second stage or zone where it is admixed with a plurality of catalysts including a second, intermediate temperature catalyst and a third, high temperature catalyst. The reaction mixture in the second stage is agitated to produce effective radial mixing thereof, with the degree of end-to-end mixing being decreased in that zone to thereby establish a temperature gradient extending longitudinally along the zone. The reaction mixture thereafter flows from the second stage into a third and last reaction stage or zone in which it is agitated to produce both radial and end-to-end mixing, with the degree of end-to-end mixing in the third zone being greater than in the contiguous portion of the second zone. The intensity of mixing of the reaction mixture in the third zone is increased to ensure that the catalyst is evenly distributed, thereby preventing the formation of hot spots caused by concentrations of catalyst and ensuring that the temperature of the reaction effluent egressing from the last stage or zone does not increase above a level of approximately 575° F.

The reaction mixture which is removed from the lastmentioned zone is thereafter subjected to decompression and the polyethylene resin product is separated from the effluent stream.

Intense mixing is particularly required in the last or final zone of the reactor for the following reasons:

In a stirred autoclave reactor used to polymerize ethylene into polyethylene, the amount of polymer produced in the reactor varies in proportion to the temperature differential which is present between the ethylene feed gas and the reaction vessel discharge materials or effluent. When ethylene is polymerized in a reaction vessel at a rate of twenty-five thousand (25,000) pounds per hour, the production of polymer may be increased by fifty (50) pounds per hour for each five-degree Fahrenheit (5° F.) increase in the temperature differential. Accordingly, it is desirable to maintain the difference in temperature between the feed gas and the reaction vessel effluent as large as possible as this maximizes the production of polyethylene. One approach to maintaining this temperature differential as large as possible is to operate the reactor with a low feed gas temperature. Unfortunately, the use of a very low temperature feed gas results in the production of resinous polymers which do not have optical and other characteristics as fine as polymers produced when utilizing feed gas at higher temperatures. Another approach to increasing polymer production is to elevate the temperature of the reaction vessel discharge materials or effluent as much as possible. However, the temperature of the product discharged from the reactor is limited, to some extent, by the effectiveness of the mixing of materials within the reactor, particularly in the final zone. Poor mixing within the reactor may result in the presence of unspent catalyst in the discharged effluent which is passed from the reactor through a discharge line to a high pressure separator. Unspent catalyst in the separator may cause a further chemical reaction therein which results in overheating of the discharged product. Overheating of the product usually results in its decomposition, obviously an undesirable end condition. Further, unspent catalyst in the reactor discharge line may cause the origination of a decomposition of the product therein, which then spreads to the bottom or discharge end of the reactor to cause a further decomposition of product. Effective intensive mixing within the reactor improves the temperature stability therein since it will evenly disperse the catalyst and reactor materials and also results in the most efficient use of the catalyst. Further, effective mixing within the reactor results in an even continuity of the polymerization reaction, in essence, product is more effectively homogenized as it is formed during the polymerization process in an exothermic reaction. This results in a reduction of hot spots within the reaction media so as to lessen the chance of the origination of a decomposition. Consequently, through the application of effective intensive mixing, the temperature of the effluent discharged from the reactor may be maintained at a higher level without undue fear that a decomposition may be triggered by a hot spot in the discharged materials caused by undispersed and unspent catalyst.

SUMMARY OF THE INVENTION

Accordingly, it is an object of the present invention to provide a turbine mixer for a chemical reactor which increases the intensity of mixing within the reactor without increasing the power required to drive the mixer.

It is another object of the present invention to provide a turbine mixer in the final zone or stage of an autoclave reactor which improves catalyst and product dispersion therein and results in a more even distribution of heat throughout the zone.

Still another object of the present invention lies in the provision of a turbine mixer in the final zone of an autoclave reactor which increases the intensity of mixing therein, with such more intense mixing allowing for a higher temperature to be maintained with the result being an increased degree of polymer production.

A further object of the present invention lies in the provision of a baffled turbine mixer for the last zone or stage of an autoclave reactor which provides intensive radial and axial mixing of the product therein, and which does not appreciably disrupt the temperature profile in the region of the reactor immediately upstream of the last zone.

Yet another object of the present invention is to provide a unbaffled turbine mixer for a reactor which is designed to provide efficient, intensive axial, or end-to-end, mixing in a zone or stage of the reactor wherein such mixing may be effectively utilized.

In accordance with one embodiment of the present invention there is disclosed a chemical reactor for producing a desired chemical reaction of materials therein, and which incorporates a turbine mixer which is designed to provide intensive mixing of the reactor materials. The reactor includes a rotatably mounted stirrer shaft upon which is mounted a rotor assembly having a plurality of radially extending turbine blades which extend substantially to the inner walls of the reactor. A stator assembly is stationarily mounted within the reactor adjacent to the rotor assembly and includes a plurality of stator vanes, with the plane of each stator vane extending substantially parallel to the axis of rotation of the shaft. Rotation of the rotor assembly relative to the stator produces intense mixing of the materials within the reactor.

Further, in accordance with the preferred embodiment of the present invention, the reactor is an autoclave reactor for polymerizing ethylene into polyethylene, and the stator assembly is positioned upstream of the rotor assembly. Moreover, in accordance with one aspect of the invention, each turbine blade has a curvilinear surface and includes an inner planar surface extending radially from the stirrer shaft, the surface extending in a plane substantially perpendicular to the axis of rotation of the shaft, and an outer surface which extends from the inner planar surface at an angle with respect to the latter. Furthermore, the stator assembly includes inner and outer concentric cylindrical supports positioned, respectively, radially inwardly and outwardly of the outer radial portions of the turbine blades, with the stator vanes being mounted so as to radially extend between the inner and outer cylindrical supports.

Further, in accordance with the disclosed embodiment of the invention, the rotor assembly includes five turbine blades symmetrically mounted about the periphery of the rotatable shaft. Also, the reactor has a substantially cylindrical shape with a length to diameter ratio (L/D) greater than fifteen, inasmuch as the turbine mixer is particularly efficient when operating in reactor vessels having a large L/D ratio. Furthermore, in one application of the present invention, the turbine mixer is mounted in the final zone of a three-stage autoclave reactor for producing polyethylene, and a baffle plate is positioned so as to extend across the reactor at the inlet to the third zone. The baffle plate prevents backmixing into the preceding stage or zone, and concurrently promotes both radial and axial mixing within the final stage.

BRIEF DESCRIPTION OF THE DRAWINGS

The foregoing and other objects and advantages of a chemical reactor having a turbine mixer constructed pursuant to the teachings of the present invention may be more readily understood by one skilled in the art, having reference to the following detailed description of several preferred embodiments thereof, taken in conjunction with the accompanying drawings; in which.

DETAILED DESCRIPTION OF THE DRAWINGS

Figure 1:
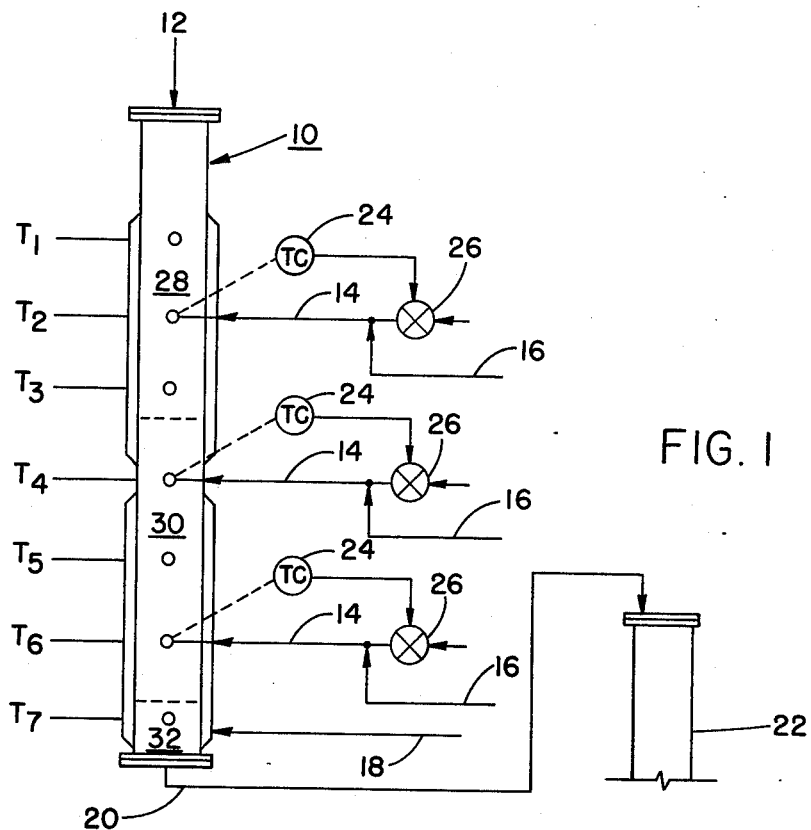
FIG. 1 is a schematic representation of an autoclave reactor used to polymerize ethylene into polyethylene.

Referring now in detail to the drawings, FIG. 1 is a schematic illustration of a modified stirred autoclave reactor 10. Olefin reactant is fed to the reactor through an initial inlet conduit 12 and also through inlet conduits 14 which are spaced along the length of the reactor. Catalyst is added to the polymerization reaction through inlet conduits 16 which are spaced along the length of the reactor, and which communicate with the reactant conduits 14. An inlet conduit 18 near the downstream end of the reactor is utilized to controllably introduce relatively cool ethylene into the last zone of the reactor to slow or quench the chemical reaction therein. The effluent from the reactor passes through an outlet 20 to a separator 22 wherein the bulk of the unreacted materials is removed from the reaction mixture. Thermocouples 24 are spaced at various locations along the length of the reactor body, and sense the temperatures at those locations. Since the polymerization of ethylene is an exothermic reaction, the temperatures at various locations in the reactor are indicative of the progress of the polymerization process. The outputs of the thermocouples are used to control the reaction in some fashion, such as by the regulated addition, through valves 26, of olefin reactant to the reactor or the controlled input of catalyst, etc.

Figure 2:
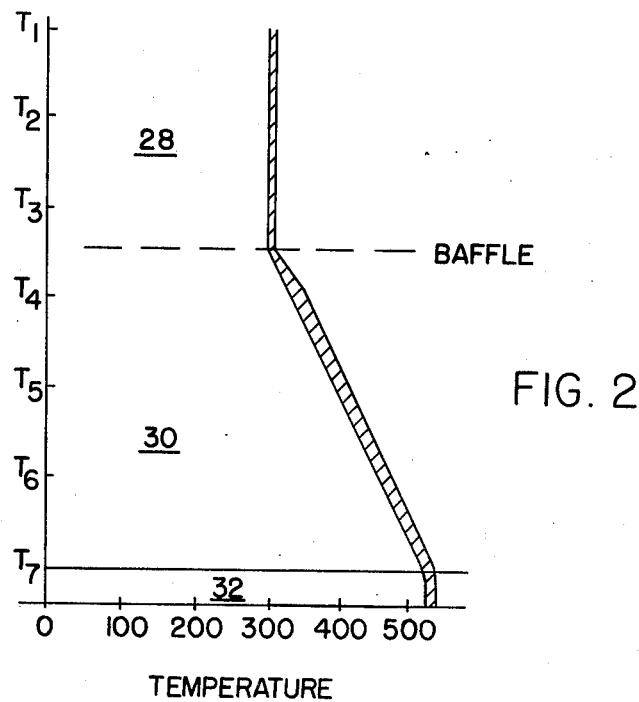
FIG. 2 is a temperature profile curve indicating typical temperatures maintained within several zones of the autoclave reactor of FIG. 1.

The three reaction zones of the autoclave reactor are indicated respectively by numerals 28, 30 and 32 in FIG. 1, and the temperature profile for these zones is shown in FIG. 2, with $T_1$ through $T_7$ indicating the temperatures of the reactant materials at spaced locations along the length of the reactor.

Figure 3:
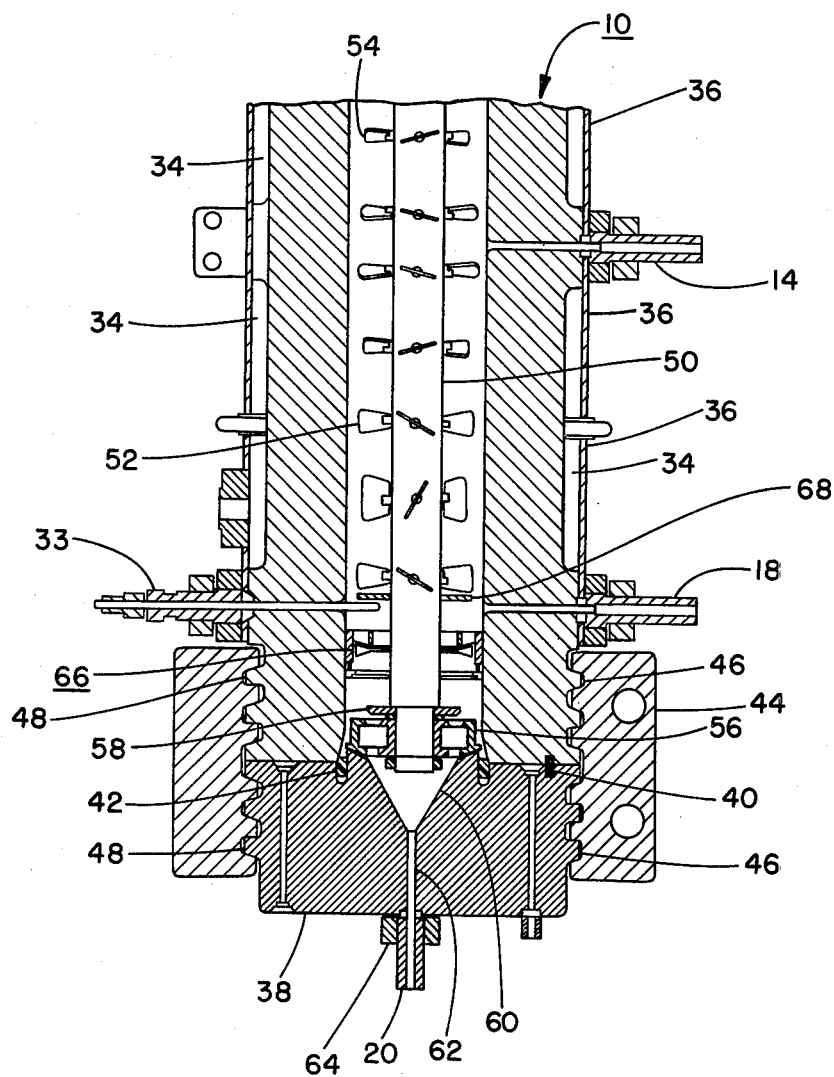
FIG. 3 is a fragmentary, sectional detailed view of the discharge end of the reaction, which schematically illustrates the turbine mixer assembly positioned therein.

FIG. 3 is a detailed fragmentary, partially sectional view of the discharge end of the reactor 10. The reactor body is fairly thick and is formed of a strong material, such as high-grade steel, which is able to withstand the relatively high pressures required in effectuating the polymerization process. The main body of the reactor vessel may be formed of three 120° sector elements secured together to form the cylindrical body of the reactor, as taught by Platz et al. Alternatively, the main body of the reactor may be formed of a unitary metal housing which is suitably cast and machined. The cylindrical reactor body may be oriented in a vertical position as taught by Pugh et al, or may be positioned horizontally as disclosed in Platz et al. Entries 33 are provided along the length of the reactor body for positioning suitable thermocouples within the reactor cavity to measure the temperatures of the reactor materials at those locations. Alternatively these entries may be used to provide access to the reaction for pressure monitoring gauges or other types of instrumentation.

Annular cooling passageways 34 are provided around the exterior of the reactor vessel for the circulation therein of a coolant medium to provide any necessary cooling for the exothermic polymerization reaction. Cylindrical cover plates 36 are secured around the passageways 34 to complete the sealing thereof. An end cap or closure member 38 is secured to the discharge end of the reactor body and is properly positioned in place through the intermediary of dowel pins 40. An annular seal ring 42 is positioned at the juncture of the end cap 38 to the main reactor body. An annularly shaped, preferably split, closure member 44 securely fastens the end cap 38 to the main body of the reactor. The closure member 44 has a number of grooves 46 formed in its inner cylindrical surface which engage a number of ridges 48 formed on the outer cylindrical surface of both the end cap 38 and the main reactor body.

A stirrer shaft 50 is rotatably mounted within the reactor vessel, and provides for mixing of the chemicals within the reactor. The shaft supports a number of sets or stages of agitator blades, the latter of which are of two types. A first type of blade, designated by reference numeral 52, has a generally pentagonal configuration and is designed to extend radially outwardly from the agitator shaft to a point adjacent or proximate to the inner cylindrical surface of the reaction chamber. These blades may extend as close as one-eighth inch to the inner wall surface, and sweep substantially the entire cross-section of the reactor. The blades cause the reaction mixture to flow downwardly as indicated in FIG. 3 when the agitator shaft is rotated in a clockwise direction as viewed from the top thereof. A second type of agitator blade, designated by reference numeral 54, has a generally trapezoidal configuration and extends radially outwardly from shaft 50 for only a portion of the radial distance through the reaction zone, sweeping about 70 percent of that zone. The blades 54 are angularly inclined in a direction complimentary to the angle of inclination of blades 52. The blades 54 cause the reaction mixture to flow upwardly along an annular portion of the reaction zone. By changing the comparative numbers and the angular orientations between the blades 52 and 54, the extent of axial flow in the reaction zone can be controlled, thereby facilitating regulation of the degree of backmixing within any preselected portion of the reaction zone or stage.

A radial roller bearing assembly 56 is provided at one end of stirrer shaft 50, and a slinger ring 58 is positioned just upstream of the bearing assembly to provide protection for the bearing assembly.

Reactor materials or effluents are withdrawn from the reactor through a conically tapered passageway 60 leading to an outlet 62 which is centrally formed in end cap 38 at the end of the reactor. An adapter 64 at the end of outlet 60 is provided to couple the reactor to conduit 20 leading to the separator 22, shown in FIG. 1.

As previously described, intensive mixing within the third and final zone of the autoclave reactor is required to, both, improve the efficiency of operation of the reactor and, concurrently, prevent decomposition of the polymer. In accordance with the teachings of the present invention, intensive mixing is provided in this third zone or stage by a turbine mixer assembly 66 positioned just upstream of bearing assembly 56 in the third or final reactor zone or stage, and by an annular baffle plate 68 positioned to extend across the reactor at the inlet to the third zone.

Figure 5:
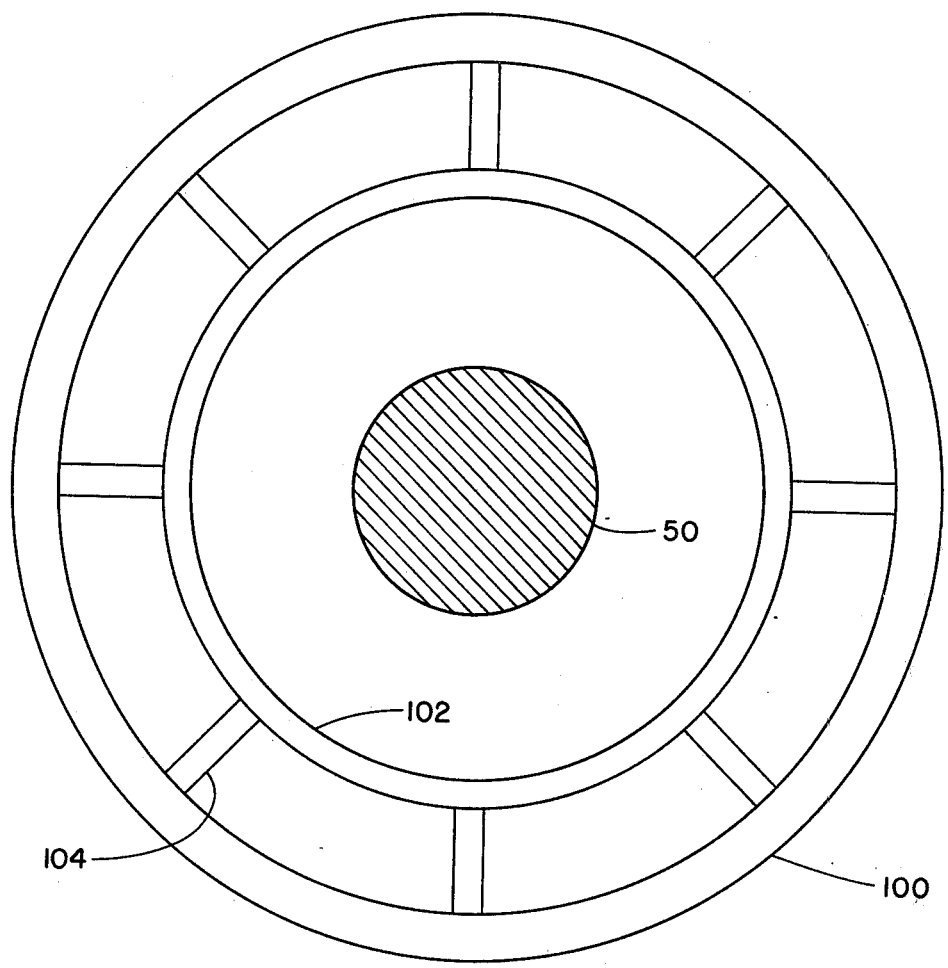
FIG. 5 is a detailed axial end view of one embodiment of a stator assembly as shown in FIG. 4.
Figure 4:
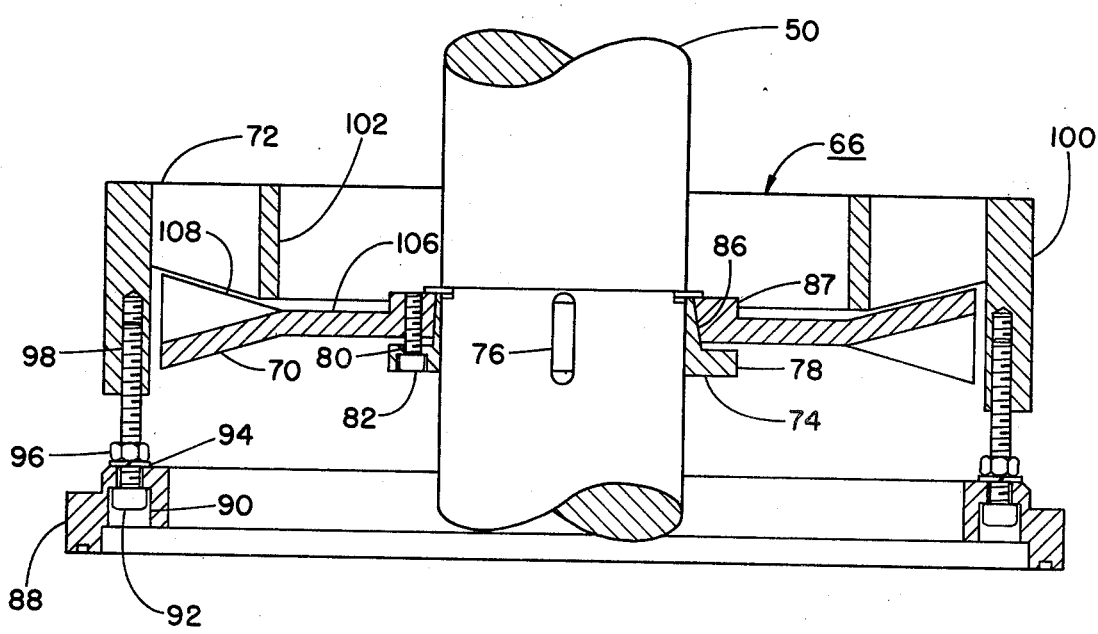
FIG. 4 is an enlarged, partially sectional view of the turbine mixer assembly shown in the last zone of the reactor in FIG. 3.

FIGS. 4 and 5 illustrate details of the turbine mixer assembly 66, which includes a rotor assembly 70 coupled to the stirrer shaft 50 so as to be rotatable therewith, and a stator assembly 72 positioned upstream of the rotor assembly and stationarily mounted within the reactor.

The rotor assembly 70 is coupled to the shaft 50 by a rotor bushing 74 which extends around the circumference thereof. A key 76 is positioned in aligned slots formed in the bushing 74 and shaft 50, and secures the bushing to the shaft for rotation therewith. The bushing 74 includes an annular flange 78 having an enlarged diameter so as to project radially outwardly from the shaft 50. A number of axially extending holes 80 are drilled through the flange 78 and are adapted to receive bolts 82 therein which serve the purpose of securing the rotor assembly to the rotor bushing 74. The rotor bushing 74 includes an axially tapered exterior conical surface 86, whereas the rotor assembly has an annular hub portion 87 having an axially tapered, interior conical surface adapted to frictionally engage exterior surface 86. Bolts 82 secure the rotor assembly to the bushing and, when drawn tight, force the two matching conical surfaces into closely-fitted frictional engagement.

The stator assembly 72, as illustrated in FIGS. 4 and 5, is secured to an annular or ring-shaped base plate 88 which, in turn, is attached to the body of the reactor. A plurality of axially extending holes 90 are drilled symmetrically around the annular base plate 88. Bolts 92 are positioned to extend through the holes 90, and are secured in place by lockwashers 94 and nuts 96. The bolts 92 extend axially into eight interiorly threaded holes 98 drilled in an outer cylindrical frame member 100 positioned to extend concentrically about shaft 50. An inner cylindrical frame member 102 is also positioned concentrically about shaft 50, and the two cylindrical frame members are secured together by a plurality, preferably eight, of radially extending stator vanes 104.

Each rotor blade is formed by a radially inner section 106 and a radially outer section 108 which is angled with respect to the inner section and extends therefrom at a location approximately halfway along the radial length of the blade. The mutual angling of the two respective blade sections results in the inner and outer planar surfaces of each blade forming a curvilinear surface. The inner blade section 106 is attached to the annular hub 87, and is positioned with its major surface extending in a plane perpendicular to the axis of rotation of stirrer shaft 50. Each rotor blade extends radially to a location in proximity to the inner cylindrical surface of outer frame member 100. The axial length of the outer cylindrical frame member 100 is greater than the axial length of the inner cylindrical frame member 102, and this arrangement allows the outer radial portion of each rotor blade to be positioned just downstream of the radially extending stator vanes which bridge the inner and outer cylindrical frame members.

The bolts 92 which extend between the annular base plate 88 and the outer cylindrical housing member 100 allow the axial position of the stator assembly to be adjusted relative to that of the rotor assembly. This adjustment of the relative positions of the rotor and stator assemblies allows the intensity and type of mixing provided by the turbine mixer to be varied.

Figure 6:
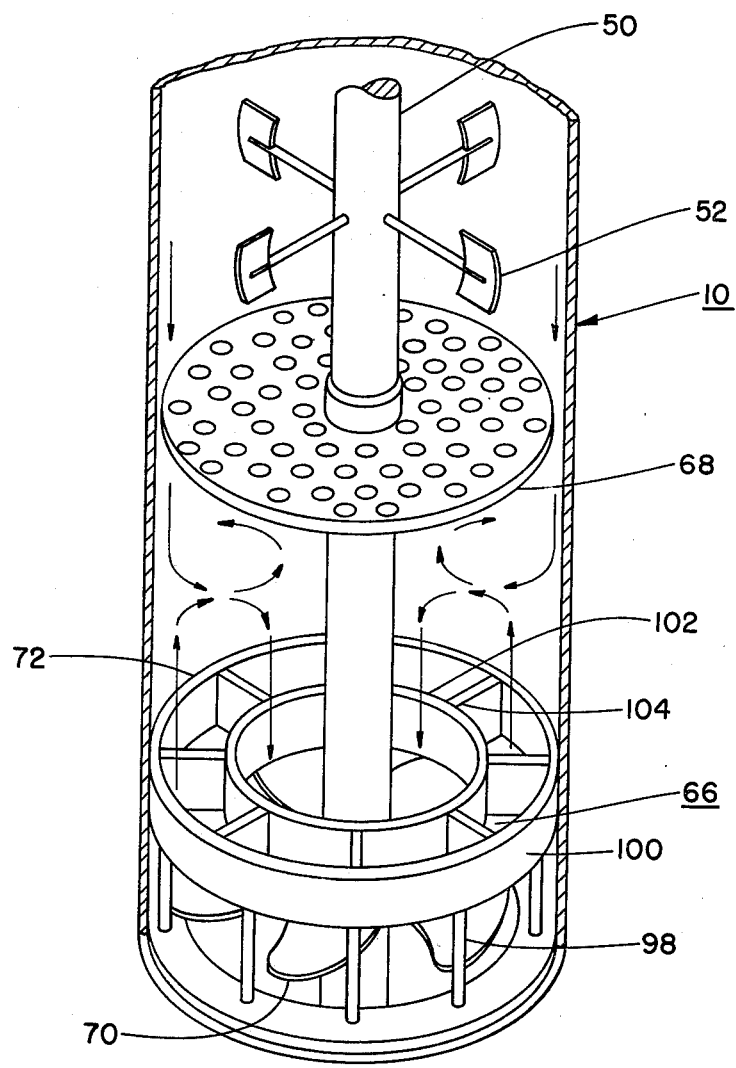
FIG. 6 is a perspective schematic illustration of the last zone of a stirred autoclave reactor, illustrative of the flow of the mixing streams set up by the turbine mixer.

Baffle 68 is positioned upstream of the turbine mixer at the entrance to the third or final zone of the reactor, as shown in FIGS. 3 and 6, and serves to substantially isolate mixing in that zone or stage from the second stage immediately upstream thereof whereby the temperature profile in the upstream region is not appreciably disturbed. The baffle has a disc shape, and extends from the stirrer shaft to which it is suitably attached to a radial position just inside the inner cylindrical wall of the reactor. This arrangement results in a narrow annular space being defined between the outer circular edge of the baffle and the reactor inner wall. The baffle plate may or may not be perforated to allow an additional flow of reactor materials therethrough, and functions to allow a gradual downstream flow of chemicals in the reactor between the second and third zones while substantially isolating mixing between the zones.

The baffle plate 68 and the components of the rotor assembly 70 and the stator assembly 72 may be constructed of high-grade steel or some other suitably strong material.

The turbine mixer and baffle establish the mixing pattern illustrated by the arrows in FIG. 6. In the schematic representation of this figure, a variation of the stator assembly 72 is illustrated wherein the outer cylindrical frame member 100 has a shorter axial length than that shown in FIG. 4 so as not to surround the rotor blades. As illustrated by the arrows in FIG. 6, the turbine mixer forces the ethylene/polyethylene chemical stream upwardly in an axial direction through the annular space between the cylindrical frames 100 and 102. Simultaneously therewith, the turbine mixer draws the chemical stream downwardly through the annular opening between the inner cylindrical frame member 102 and the stirrer shaft 50. The multiple sets of blades 52 mounted on the stirrer shaft 50, illustrated schematically in FIG. 6, pump the chemical mixture axially downwardly along the inner wall of the reactor vessel and through the annular space surrounding the baffle plate. The downward axial flow around the baffle meets the upward axial flow from the turbine mixer, and the converging steams are redirected in a radially inward direction. Part of the inwardly flowing stream is drawn down along the shaft 50 into the turbine mixer, while a portion of the stream flows upwardly along the shaft and then radially outwardly along the bottom of the baffle plate until it rejoins the downwardly axial flow along the inner wall of the reactor. These flow patterns result in an intense mixing of the chemicals in the final zone or stage of the reactor, which lessens or even eliminates the formation of hot spots caused by concentrations of catalysts, and thereby allows the temperature of the reactor effluent to be maintained at a higher level. The higher temperature of the chemical mixture in the final zone results in an increase in polymer production and in a more efficiently operated reactor.

In some mixing applications in which there is primarily desired a flow in an axial direction, the baffle plate is omitted so as to result in a primarily axial flow pattern, with the flow along the stirrer shaft being opposite to the axial flow along the reactor chamber wall. In these applications the flow directions are determined by the orientation of the turbine blades and the direction of rotation of the stirrer shaft.

During tests of the turbine mixer arranged within a modified autoclave reactor, the mixer provided intensive mixing of the reactor products while requiring less motive or driving power than a prior art mixer of the type disclosed by the Pugh et al patent, the latter of which includes only blades 52 and 54.

Furthermore, tests of the turbine mixer without a baffle plate 68 demonstrated that an unbaffled mixer produced intensive axial mixing of the reactor products. Moreover, this intensive axial mixing required less driving power than would be required for a similar mixing effect by a mixer having blades of types 52 and 54. Accordingly, an unbaffled turbine mixer of this type can be effectively used to provide intensive axial mixing of reactor products within a zone or stage of a chemical reactor in which there is required mixing of this nature.

Although one preferred embodiment and several applications of the turbine mixer of the present invention have been described in detail, the present teachings will suggest many alternative embodiments and applications to those skilled in the art. Thusly, for some mixing applications it may be desirable to position the stator assembly downstream of the rotor assembly rather than upstream thereof. Additionally, the configuration and number of blades in the rotor assembly may be varied from embodiment to embodiment, as may the number and configuration of the stator vanes (e.g. some of the stator vanes may extend in a plane parallel with the axis of the stirrer shaft but not radial with respect thereto).

What is claimed is:

1. In a chemical reactor including a reactor chamber for producing a desired chemical reaction of materials therein as the chemicals flow generally from an upstream portion of the reactor to a downstream portion of the reactor, a turbine mixer for providing intense mixing of the chemical materials, comprising:
   (a) a rotatably mounted shaft positioned within said reactor chamber;
   (b) a rotor assembly having a plurality of radially extending turbine blades mounted on said shaft for rotation therewith, said turbine blades extending radially outwardly into proximity with the inner wall surface of said reactor chamber, each said turbine rotor blade having a curvilinear surface with a first inner radial section radially extending from said rotatably mounted shaft and having a major surface area in a first plane and a second outer radial section radially extending from the first inner section and having a major surface area in second plane, and the plane of a major surface area of said outer radial section being angled with respect to the plane of the major surface area of the inner radial section so as to impart a generally curvilinear surface contour to each said rotor blade; and
   (c) a stator assembly stationarily mounted within said reactor chamber adjacent to and directly upstream of said rotor assembly, said stator assembly comprising,
   (i) an outer cylindrical frame member positioned adjacent the inner wall surface of said reactor chamber and extending coaxially and concentrically with said rotatably mounted shaft,
   (ii) a plurality of substantially radially extending stator vanes extending between and being fastened to said inner and outer cylindrical frame members and mounted adjacent to the outer radial sections of said turbine blades, and the plane of the major surface area of each stator vane extending substantially parallel to the axis of rotation of said shaft, whereby relative rotation between the rotor and stator assemblies produces intense mixing of the materials within the chemical reactor chamber.

2. A chemical reactor as claimed in claim 1, said reactor being an autoclave reactor for polymerizing ethylene into polyethylene.

3. A chemical reactor as claimed in claim 1, said outer cylindrical frame member having a longer axial length than that of said inner cylindrical frame member, a portion of the outer frame member encompassing said turbine rotor blades.

4. A chemical reactor as claimed in claim 3, comprising means for adjusting the relative axial positions of said stator and rotor assemblies within said reactor chamber.

5. A reactor as claimed in claim 4, said reactor chamber having a substantially cylindrical configuration with a length to diameter ratio of greater than fifteen.

6. A reactor as claimed in claim 5, said turbine mixer being mounted in the final zone of a three-stage autoclave reactor, comprising a baffle plate positioned to extend across the reactor chamber at the inlet to said third zone, said baffle plate being adapted to prevent backmixing into the previous zone and concurrently promote both radial and axial mixing within said final zone.

7. A reactor as claimed in claim 6, said plurality of radially extending turbine rotor blades comprising five turbine blades equidistantly spaced about the circumference of said shaft.

8. A reactor as claimed in claim 1, comprising means for adjusting the relative axial positions of the stator and rotor assemblies within said reactor chamber.

9. A reactor as claimed in claim 1, said reactor chamber having a substantially cylindrical shape with a length to diameter ratio of greater than fifteen.

10. A reactor as claimed in claim 1, said turbine mixer being mounted in the final zone of a three-stage autoclave reactor, comprising a baffle plate positioned to extend across the reactor chamber at the inlet to said third zone, said baffle plate being adapted to prevent backmixing into the previous zone and concurrently promote both radial and axial mixing within said final zone.

* * * * *